US012100892B2

(12) United States Patent
Kaffash et al.

(10) Patent No.: US 12,100,892 B2
(45) Date of Patent: Sep. 24, 2024

(54) MULTI-BAND TRANSPARENT COPLANAR SLOT ANTENNA USING CONDUCTIVE WINDSHIELD COATING

(71) Applicant: GM GLOBAL TECHNOLOGY OPERATIONS LLC, Detroit, MI (US)

(72) Inventors: Sara Kaffash, Waterloo (CA); Farhad Sheikh Hosseini Lori, Toronto (CA); William Hsiahua Wang, Troy, MI (US); Hongguang Sun, Vaughan (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 17/931,022

(22) Filed: Sep. 9, 2022

(65) Prior Publication Data

US 2024/0088568 A1 Mar. 14, 2024

(51) Int. Cl.

| | |
|---|---|
| ***H01Q 13/10*** | (2006.01) |
| ***H01Q 1/12*** | (2006.01) |
| ***H01Q 9/28*** | (2006.01) |

(52) U.S. Cl.

CPC ............. *H01Q 13/10* (2013.01); *H01Q 9/285* (2013.01); *H01Q 1/1271* (2013.01)

(58) Field of Classification Search

CPC ...... H01Q 1/1271; H01Q 13/10; H01Q 9/285; H01Q 13/206; H01Q 9/40; H01Q 1/36; H01Q 9/42

See application file for complete search history.

(56) References Cited

U.S. PATENT DOCUMENTS

2012/0154231 A1* 6/2012 Puente Baliarda ...... H01Q 9/40 343/752

FOREIGN PATENT DOCUMENTS

WO WO-2012079040 A1 * 6/2012 ........... H01Q 1/1271

* cited by examiner

*Primary Examiner* — David E Lotter
*Assistant Examiner* — Aladdin Abdulbaki
(74) *Attorney, Agent, or Firm* — Lorenz & Kopf, LLP

(57) ABSTRACT

An optically transparent coplanar microwave slot antenna formed between a first glass layer and a second glass layer is provided including a metal oxide layer, a first slot element and a second slot element formed in a dipole arrangement within the metal oxide layer wherein the first slot element is formed by a first triangular slot, a first trapezoidal slot, and a first rectangular slot and the second slot element is formed by a second triangular slot, a second trapezoidal slot, and a second rectangular slot, and a waveguide feedline for carrying microwave signals to the first slot element and the second slot element.

20 Claims, 4 Drawing Sheets

400

MULTI-BAND TRANSPARENT COPLANAR SLOT ANTENNA USING CONDUCTIVE WINDSHIELD COATING

INTRODUCTION

The present disclosure generally relates to antennas, and more particularly relates to coplanar slot antennas integrated into a metallic infrared rejection layer for vehicle windows.

More and more advanced electronic systems are increasingly being integrated into modern vehicles. Examples may include infotainment systems, vehicle control systems, remote user interfaces, wireless communication systems and the like. Often these electronics systems require antennas to communicate with systems outside of the vehicle, such as cellular networks, Wi-Fi networks, near field communication systems, Bluetooth communication, etc. Previously these antennas may be protruding from the vehicle outer surface, such as monopole antennas, dipole antennas, or groupings of antennas housed in an eternally mounted ‘shark fin’ protective housing.

Vehicle radio antennas typically configured as wire dipoles or wire monopoles have also been mounted to, or embedded within, vehicle window glass for many years. Window mounting of radio antennas moves the antenna radiating elements away from reflective metal surfaces of the vehicle and provides physical protection for the delicate antenna structures. However, these antennas may cause visual obstructions to a driver or vehicle occupant. To address this problem, glass mounted vehicle antennas were often positioned at the outer edges of the vehicle windows to reduce the visible obstructions to the driver. However, moving the glass mounted antennas closer to the edge of the windows also brought the antennas closer to the metal structures of the vehicle and therefore affected the radiation pattern and efficiency of the antenna. Accordingly, it is desirable to address the aforementioned problems and to provide systems and methods for providing a glass mounted antenna. Furthermore, other desirable features and characteristics of the present disclosure will become apparent from the subsequent detailed description and the appended claims, taken in conjunction with the accompanying drawings and the foregoing technical field and background.

SUMMARY

Antenna structures are provided for transmitting and receiving microwave electromagnetic signals. In one embodiment, a vehicle windshield includes a first glass layer, a second glass layer, a resin interlayer between the first glass layer and the second glass layer, and a metalized infrared rejection interlayer between the resin interlayer and the second glass layer, wherein the metalized infrared rejection interlayer includes a first slot element and a second slot element formed in a dipole arrangement wherein the first slot element is formed by a first triangular slot, a first trapezoidal slot, and a first rectangular slot and the second slot element is formed by a second triangular slot, a second trapezoidal slot, and a second rectangular slot.

In accordance with another exemplary embodiment, the metalized infrared rejection interlayer includes a first waveguide slot and a second waveguide slot and a waveguide feedline for carrying microwave signals to the first slot element and the second slot element.

In accordance with another exemplary embodiment, the first waveguide slot and the second waveguide slot are conductively coupled to a subminiature connector.

In accordance with another exemplary embodiment, the metalized infrared rejection layer is conductively coupled to a vehicle chassis.

In accordance with another exemplary embodiment, the metalized infrared rejection layer is conductively isolated from a vehicle chassis.

In accordance with another exemplary embodiment, the metalized infrared rejection layer covers a portion of the vehicle windshield.

In accordance with another exemplary embodiment, the metalized infrared rejection interlayer is formed from a metal oxide and is optically transparent.

In accordance with another exemplary embodiment, the dipole arrangement including the first slot antenna and the second slot antenna has an overall dimension of 44 mm by 48.4 mm.

In accordance with another exemplary embodiment, the dipole arrangement is formed by preventing a deposit of a metal oxide of the metalized infrared rejection layer over the area of first slot element and the second slot element.

In accordance with another exemplary embodiment, an apparatus includes a first glass layer, a resin interlayer affixed to the first glass layer, a metal oxide layer affixed to the resin interlayer wherein the metal oxide layer includes a dipole slot antenna including a first element and a second element, wherein the first element is formed from a triangular slot, a trapezoidal slot, and a rectangular slot and wherein the second element is a mirror image of the first element around a first axis, and a second glass layer affixed to the metal oxide layer.

In accordance with another exemplary embodiment, the dipole slot antenna of is formed by an absence of metal oxide in the metal oxide layer.

In accordance with another exemplary embodiment, the metal oxide layer includes a feedline for carrying microwave signals to the dipole slot antenna.

In accordance with another exemplary embodiment, the triangular slot, the trapezoidal slot, and the rectangular slot form a Christmas tree shape.

In accordance with another exemplary embodiment, the metal oxide layer is optically transparent.

In accordance with another exemplary embodiment, the metal oxide layer has an optical transmittance greater than 90%.

In accordance with another exemplary embodiment, the apparatus is a vehicle windshield with an integrated multi-band communication antenna.

In accordance with another exemplary embodiment, a coplanar slot antenna including a metal oxide layer, a first slot element and a second slot element form a dipole arrangement within the metal oxide layer wherein the first slot element is formed by a first triangular slot, a first trapezoidal slot, and a first rectangular slot and the second slot element is formed by a second triangular slot, a second trapezoidal slot, and a second rectangular slot, and a waveguide feedline for carrying microwave signals to the first slot element and the second slot element.

In accordance with another exemplary embodiment, the metal oxide layer is formed on a vehicle window.

In accordance with another exemplary embodiment, the waveguide feedline is conductively coupled to a vehicle infotainment system.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
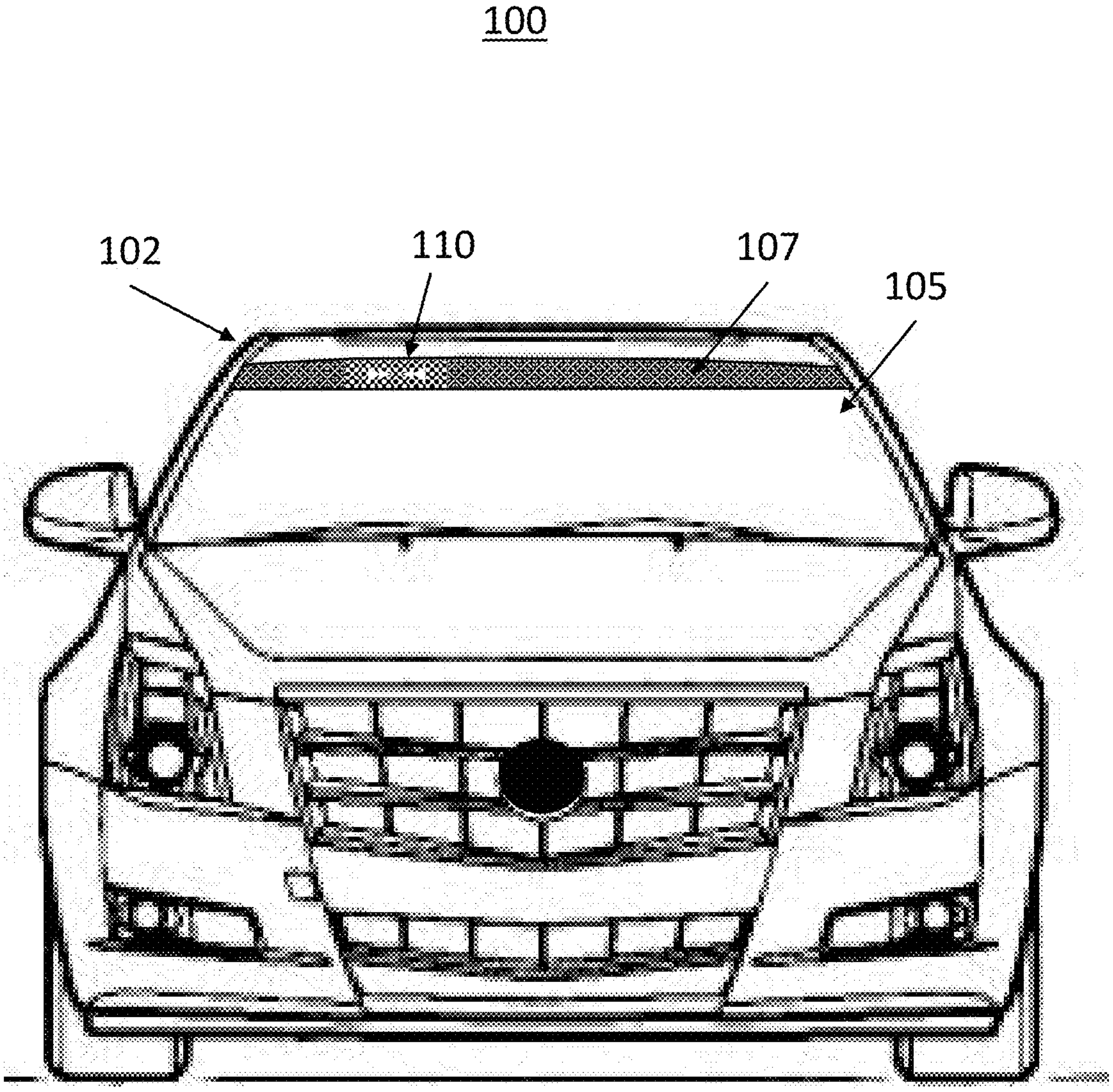
FIG. 1 is an exemplary environment for use of the multi-band coplanar slot antenna embedded in a metalized infrared rejection (IRR) layer is shown in accordance with various embodiments.

Turning now to FIG. 1, an exemplary environment 100 for use of the multi-band coplanar slot antenna 110 embedded in a metalized infrared rejection (IRR) layer 107 associated with a vehicle 102 is shown in accordance with various embodiments.

Vehicle windows 105 are often equipped with a metallized IRR layer 107 to reduce the transmission of infrared light from outside the vehicle 102 to inside the vehicle cabin. Infrared light is the primary source for light generated heat inside of the vehicle cabin resulting from the vehicle glass allowing infrared light to pass into the vehicle cabin and then trapping the resulting heat inside the vehicle cabin. A metallized IRR 107 can be used to reduce transmission of the infrared light through the vehicle window 105, thereby reducing the heat trapped inside the vehicle cabin. In some exemplary embodiments, the metallized IRR layer 107 may be a 1- to 2-micron layer of metal oxide. The metal oxide can be composed of tin, zinc and indium. Alternatively, the metallized IRR 107 can be constructed from a very fine wire mesh embedded within, or layered upon, the vehicle window 105. The metallized IRR 107 is configured to prevent infrared light from being transmitted through the vehicle glass by reflecting the infrared light back towards the outside of the vehicle 102. However, the metalized IRR layer 107 also prevents transmission of electromagnetic signals into and out of vehicle 102. As a result, undesirable signal attenuation or antenna gain distortion occurs of vehicle cabin located antennas or when vehicle occupants use wireless mobile devices, such as cell phones, or when glass mounted antennas are desired for electromagnetic signal transmission and reception.

The exemplary antenna 110 is configured in such a way to be optically transparent to a vehicle occupant by removing a portion of the metallized IRR 107 to create a slot antenna 110. Advantageously, the exemplary slot antenna 110 therefore may be formed on the vehicle windshield 105 without significantly obstructing an outside view from the vehicle occupant. Mounting the exemplary antenna 110 to a glass surface, such as the vehicle windshield 105, reduces the distortion of the radiation pattern of the exemplary antenna 110 caused by conductive surfaces of the vehicle 102 and allows electromagnetic signals to be transmitted and received from devices inside the vehicle cabin.

In some exemplary embodiments, the metallized IRR 107 may cover an entire vehicle window 105 or may cover a portion of the vehicle window 105 as is shown. The metallized IRR 107 may be conductively coupled to the body of the vehicle 102 via conductive tabs or wires. Alternatively, the metalized IRR 107 may be electrically isolated from the vehicle body, such as by a gap between the edge of the metalized IRR 107 and the edge of the vehicle window 105. The antenna 110 can be a slot antenna formed by removing a portion of the metallized IRR layer 107. For example, an exemplary antenna may be a narrow rectangle cut from the metallized IRR 107 having a length of 12.5 cm and a width much less than the length, such as 1 cm, to have a resonant frequency of 12.5 GHz. This slot would allow for the maximum coupling of 12.5 GHz signals from a device within the vehicle cabin through the vehicle window 105 while maintaining approximately the same level of infrared radiation rejection. In some exemplary embodiments, the electromagnetic signals transmitted by a transmitter either outside or inside the vehicle cabin are coupled through the vehicle window 105 via the antenna 110 to a receiver. In these examples, the antenna can be excited by the signal received through the air from a device within the vehicle cabin.

In some exemplary embodiments, the antenna 110 is configured to transmit and receive electromagnetic signals within specific frequency bands for communicating data between a network interface and a user device. The transmit and/or received signals can be coupled from the antenna 110 to a transceiver within the vehicle cabin via an input that is conductively coupled to the antenna 110. In some exemplary embodiments, a user within the vehicle 102 may have a tablet computer used for displaying audio video programming. This audio video programming may be received from a streaming media service via an internet connection. The user may configure the tablet computer wireless network interface to connect to a wireless network provided within the vehicle 102. The antenna 110 is used to receive a wireless network signal from the tablet computer and couple the signal to the network interface or other processor within the vehicle 102. The network interface may be connected to a vehicle communication system, such as a cellular network interface, for receiving data, such as the audio video program, from an outside source via a cellular network. In some exemplary embodiments, the cellular network interface may be coupled to a separate antenna mounted to the vehicle 102 for receiving the cellular network signal.

In addition, the exemplary antenna 110 can be configured to transmit and receive signals between the vehicle communication system and an outside signal source. For example, the vehicle communication system may be communicatively coupled to a vehicle infotainment system and may transmit electromagnetic signals from the infotainment system to a cellular network tower. In some exemplary embodiments, the antenna 110 can be an optically transparent multi-band slot antenna formed in the metalized IRR layer 107 in the windshield for vehicle to everything (V2 X), Electronic Toll Collection (ETC), 2.4 GHz Wi-Fi and Bluetooth Low Energy (BLE) vehicle access communication. The realized gain of the antenna 110 can be more than 1 dBi over required beam width with the minimum return loss of 10 dB across all operating bands.

Figure 2:
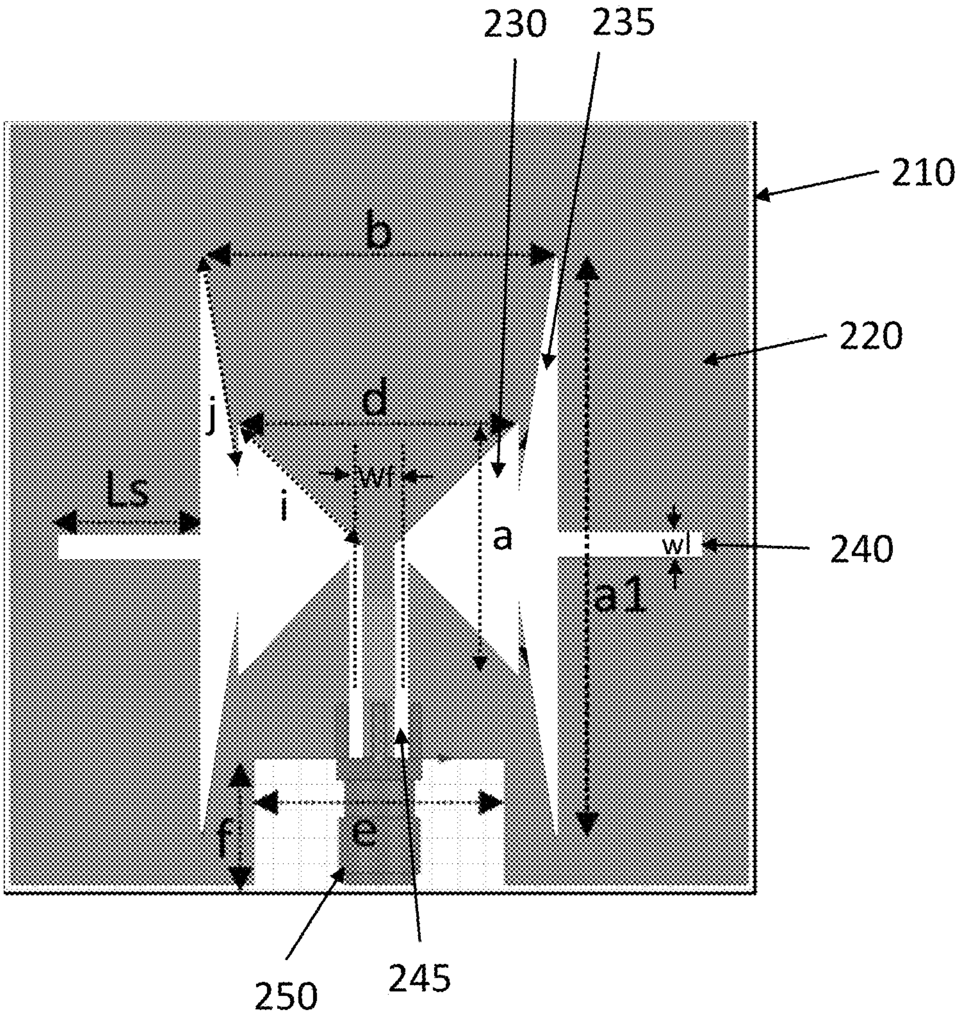
FIG. 2 is an exemplary coplanar slot antenna formed in a metalized IRR is shown in accordance with various embodiments.

Turning now to FIG. 2, an exemplary coplanar slot antenna 210 formed in a metalized IRR layer 220 associated with a vehicle window of FIG. 1 is shown in accordance with various embodiments. In some exemplary embodiments, the antenna 210 can include a coplanar waveguide and dual Christmas tree shaped slots formed from omitting or removing a portion of a metalized IRR layer 220.

In some exemplary embodiments, the antenna 210 can include overlapping triangular 230, 235 and rectangular 240 slot portions in order to create two Christmas tree shaped slots which are configured in such a way to extend the bandwidth of the antenna 210 to cover multiple frequency bands, such as frequency bands centered around 2.4 GHz and 5.5 GHz. Advantageously, the exemplary antenna 210 may be easily fabricated by preventing application of the metalized IRR over the desired antenna structure to create the intended slot antenna formation or by being retrofit in existing vehicles with surface mounted metalized IRR layers used as a multi-band antenna. The antenna 210 can be configured such that no matching network and no integrated substrate or reflective backplane is required for its operation and support.

In general, the antenna 210 may be a coplanar slot antenna formed in a metalized IRR layer 220 in a vehicle glass. The coplanar slot may be formed by two Christmas tree shaped slots, each having two overlapping triangular shaped slots 230, 235 and a single rectangular slot 240 running from a base of the outermost triangular slot towards a distal edge of the metalized IRR layer 220. The antenna 210 may be coupled to an external transmission line by a coplanar waveguide 245. The coplanar waveguide may be coupled to the external transmission line by an integrated electrical connector 250. In some exemplary embodiments, the multi-band slot antenna 210 can be configured to operate in frequency bands covering the 2.4 GHz and 5.5 GHz bands with a realized gain of more than 1.0 dBi. The antenna 210 may have a minimum return loss of 10 dB and a null free radiation pattern over all the operating bands.

The overlapping triangular slot portions 230, 235 can be configured as an overlapping triangular dipole antenna. The rectangular portion 240 of the Christmas tree slots are configured as a dipole antenna having a lower resonant frequency than that of the triangular slot 230, 235 portions. In some exemplary embodiments, a portion of the metalized IRR layer 220 including the antenna 210 may be isolated from a larger portion of the metalized IRR layer 220. For example, FIG. 2 is illustrative of a rectangular portion of the metalized IRR layer. This electrical isolation of the smaller portion of the metalized IRR layer 220 may enhance antenna performance.

Figure 4:
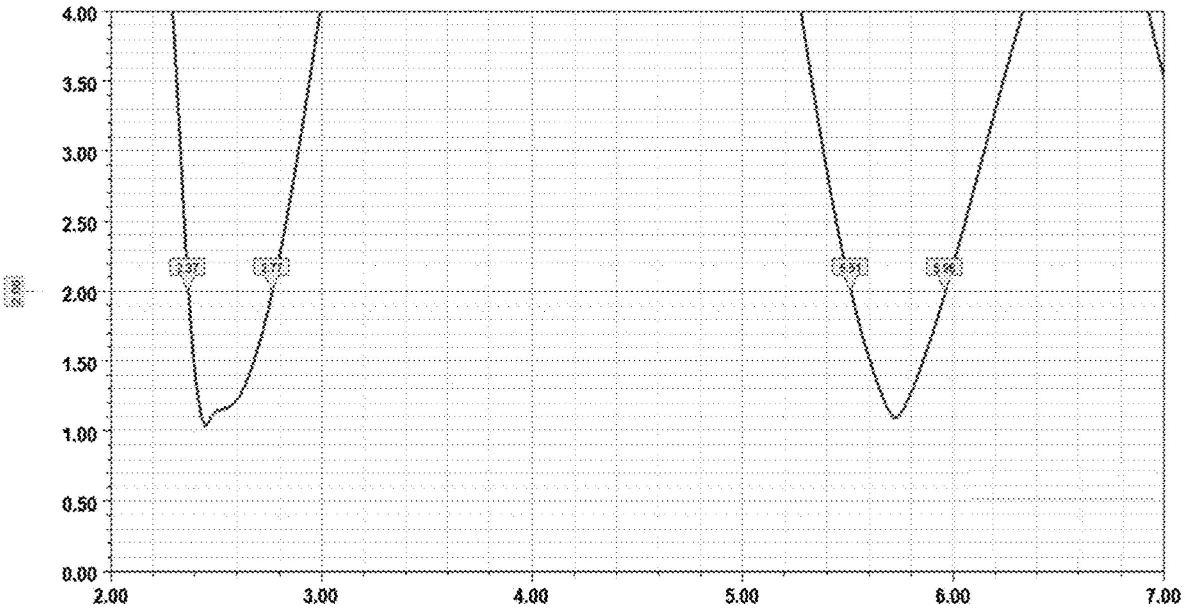
FIG. 4 is a graph displaying a voltage standing wave ratio for an exemplary multi-band coplanar slot antenna in accordance with various embodiments.

Table 1 is illustrative of the exemplary dimensions of the antenna 210 for optimal performance to cover the vehicle to everything (V2X) and Electronic Toll Collection (ETC) within a frequency band centered at 5.5 GHz and the 2.4 GHz Wi-Fi and Bluetooth Low Energy (BLE) vehicle access within a frequency band centered at 2.4 GHz. A graph 400 displaying the corresponding voltage standing wave ratio (VSWR) for an exemplary antenna with the dimensions as listed in Table 1 is shown in FIG. 4. Marginal variation of these dimensions of +/−10% observed without significant effects on the total antenna performance. To achieve a desired optical transparency, the optical transmittance of the metallized IRR layer should be greater than 85%.

TABLE 1

| Antenna Dimensions | |
|---|---|
| a | 18.3 mm |
| a1 | 44.0 mm |
| b | 26.6 mm |
| d | 21.0 mm |
| e | 19.0 mm |
| f | 9.5 mm |
| i | 12.9 mm |
| j | 20.0 mm |
| Ls | 10.9 mm |
| wl | 1.6 mm |
| Wf | 2.6 mm |

Contributions to the antenna resonance at the operating frequencies are afforded by each of the two overlapping triangular shaped slots 230, 235 and a single rectangular slot 240. The smaller, innermost triangular shaped slot 230 can have a width of 18.3 mm and the larger, outermost trapezoidal slot 235 can have a width of 44 mm contribute primarily to the 5.5 GHz frequency band. The rectangular portion 240 of the slot antenna 210 and the outermost trapezoidal slot 235 contribute primarily to the 2.4 GHz frequency band. The rectangular portion can have a length of 10.9 mm. In some exemplary embodiments, the antenna 210 may form a dipole arrangement including the first slot antenna and the second slot antenna has an overall dimension of 44 mm by 48.4 mm. Marginal variation of +/−10% can be made without significant effects on the total antenna performance.

In some exemplary embodiments, the antenna 210 can include a plurality of Christmas tree shaped apertures each formed by a triangular slot, a trapezoidal slot aperture and a rectangular slot aperture. The rectangular slot aperture can be 1.6 mm by 10.9 mm. The triangular aperture can be an isosceles triangle having a leg length of 12.9 mm and a base of 18.3 mm. The trapezoidal slot can be an isosceles trapezoid having a leg length of 20 mm and a base of 44 mm. These dimensions can be varied by up to 10% without significant effects on the total antenna performance.

Figure 3:
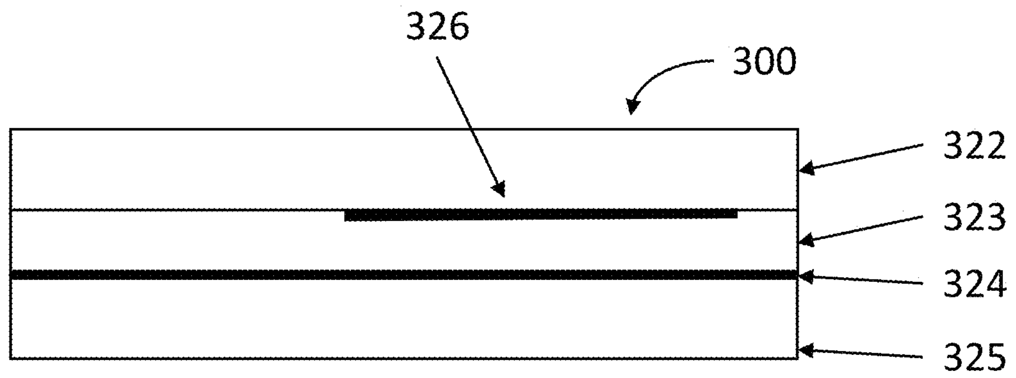
FIG. 3 is an exemplary embodiment illustrative of a cross section of a vehicle windshield including the multi-band coplanar slot antenna in accordance with various embodiments.

With reference now to FIG. 3, an exemplary embodiment illustrative of a cross section of a vehicle windshield 300 including the multi-band coplanar slot antenna 324 is shown in accordance with various embodiments. The antenna 234 is coplanar such that all conductors are arranged in the same plane. In some exemplary embodiments, the metallized IRR layer may be a 1- to 2-micron layer of metal oxide. The metal oxide can be composed of tin, zinc and indium. In some exemplary embodiments, the antenna 234 is positioned between a first layer of vehicle glass 322 and a second layer of vehicle glass 325. The exemplary windshield 300 may further include a layer of polyvinyl butyral (PVB) 322 which is employed to distribute impact forces across a greater area of the glass panes in the case of impact of an object with the windshield and to bind glass fragments in the case of windshield breakage.

In some exemplary embodiments, an optional reflective element 326 may be applied to the opposite side of the PVB layer from that of the coplanar antenna to reflect signals transmitted from the coplanar antenna to increase the directivity of the antenna 324. The reflective element 326 is optional and will alter the directivity of the multi-band coplanar antenna 324 to increase the directivity in a direction opposite of the reflective element 326. For example, in the exemplary embodiment of FIG. 3, the directivity of the antenna 324 would be increased in a direction toward the second layer of vehicle glass 325 and decreased in a direction toward the first layer of vehicle glass 322. The reflective element 326 can be formed by an optically transparent conductive grid, a second player of metallized IRR layer or any suitable conductive surface.

Turning now to FIG. 4, a graph 400 displaying the corresponding voltage standing wave ratio (VSWR) for an exemplary antenna with the dimensions as listed in Table 1 is shown. In general, the smaller of the triangular slots on each of the Christmas tree slots provides the highest contribution to signal radiation in the 5.5 GHz to 6.0 GHz frequency band. The larger of the triangular slots provides the highest contribution to signal radiation in the 2.3 GHz to 2.8 GHz band. The rectangular slot provides the highest contribution to signal radiation in the 2.4 GHz band.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle windshield comprising:

a first glass layer;

a second glass layer;

a resin interlayer between the first glass layer and the second glass layer; and a metalized infrared rejection interlayer between the resin interlayer and the second glass layer, wherein the metalized infrared rejection interlayer includes a first slot element and a second slot element formed in a dipole arrangement wherein the first slot element is formed by a first triangular slot, a first trapezoidal slot, and a first rectangular slot and the second slot element is formed by a second triangular slot, a second trapezoidal slot, and a second rectangular slot.

2. The vehicle windshield of claim 1 wherein the metalized infrared rejection interlayer includes a first waveguide slot and a second waveguide slot.

3. The vehicle windshield of claim 2 wherein the first waveguide slot and the second waveguide slot are conductively coupled to a connector.

4. The vehicle windshield of claim 1 wherein the metalized infrared rejection interlayer is conductively coupled to a vehicle chassis.

5. The vehicle windshield of claim 1 wherein the metalized infrared rejection interlayer is conductively isolated from a vehicle chassis.

6. The vehicle windshield of claim 1 wherein the metalized infrared rejection interlayer covers a portion of the vehicle windshield.

7. The vehicle windshield of claim 1 wherein the metalized infrared rejection interlayer is formed from a metal oxide and is optically transparent.

8. The vehicle windshield of claim 1 wherein the dipole arrangement including the first slot element and the second slot element has an overall dimension within 10% of 44 mm by 48.4 mm.

9. The vehicle windshield of claim 1 wherein the dipole arrangement has first center frequency of 2.4 GHz and a second center frequency of 5.5 GHz.

10. The vehicle windshield of claim 1 wherein the dipole arrangement is formed by preventing a deposit of a metal oxide of the metalized infrared rejection interlayer over an area of first slot element and the second slot element.

11. An apparatus comprising:

a first glass layer;

a resin interlayer affixed to the first glass layer;

a metal oxide layer affixed to the resin interlayer wherein the metal oxide layer includes a dipole slot antenna including a first element and a second element, wherein the first element is formed from a triangular slot, a trapezoidal slot, and a rectangular slot and wherein the second element is a mirror image of the first element around a first axis; and a second glass layer affixed to the metal oxide layer.

12. The apparatus of claim 11 wherein the dipole slot antenna is formed by an absence of metal oxide in the metal oxide layer.

13. The apparatus of claim 11 wherein the metal oxide layer includes a feedline for carrying microwave signals to the dipole slot antenna.

14. The apparatus of claim 11 wherein the triangular slot, the trapezoidal slot, and the rectangular slot form a Christmas tree shape.

15. The apparatus of claim 11 wherein the metal oxide layer is optically transparent.

16. The apparatus of claim 11 wherein the metal oxide layer has an optical transmittance greater than 90%.

17. The apparatus of claim 11 wherein the apparatus is a vehicle windshield with an integrated multiband communication antenna.

18. A coplanar slot antenna comprising:

a metal oxide layer;

a first slot element and a second slot element formed in a dipole arrangement within the metal oxide layer wherein the first slot element is formed by a first triangular slot, a first trapezoidal slot, and a first rectangular slot and the second slot element is formed by a second triangular slot, a second trapezoidal slot, and a second rectangular slot; and a waveguide feedline for carrying microwave signals to the first slot element and the second slot element.

19. The coplanar slot antenna of claim 18 wherein the metal oxide layer is formed on a vehicle window.

20. The coplanar slot antenna of claim 18 wherein the waveguide feedline is conductively coupled to a vehicle infotainment system.

* * * * *